(12) United States Patent
Li

(10) Patent No.: US 7,377,537 B2
(45) Date of Patent: May 27, 2008

(54) ADJUSTABLE SEAT FOR A BABY STROLLER WITH ONE-HANDED INCLINATION CONTROL

(75) Inventor: Wei-Yeh Li, Tainan County (TW)

(73) Assignee: Link Treasure Limited, Tortola (VG)

( * ) Notice: Subject to any disclaimer, the term of this patent is extended or adjusted under 35 U.S.C. 154(b) by 56 days.

(21) Appl. No.: 11/529,594

(22) Filed: Sep. 29, 2006

(65) Prior Publication Data
US 2007/0069505 A1 Mar. 29, 2007

(30) Foreign Application Priority Data
Sep. 29, 2005 (TW) ............................. 94216818 U

(51) Int. Cl.
*B62B 1/00* (2006.01)
(52) U.S. Cl. .................... 280/650; 280/658; 280/642; 280/47.38
(58) Field of Classification Search ............... 280/650, 280/655.1, 658, 642, 648, 644, 47.4, 47.371, 280/47.38; 297/440.1, 452.13, DIG. 11; 403/105, 314
See application file for complete search history.

(56) References Cited

U.S. PATENT DOCUMENTS

| | | | | |
|---|---|---|---|---|
| 4,836,573 A | * | 6/1989 | Gebhard | 280/644 |
| 4,892,327 A | * | 1/1990 | Cabagnero | 280/650 |
| 5,028,061 A | * | 7/1991 | Hawkes | 280/47.4 |
| 5,069,474 A | * | 12/1991 | Tai | 280/658 |
| 5,257,799 A | * | 11/1993 | Cone et al. | 280/642 |
| 5,460,430 A | * | 10/1995 | Miga et al. | 297/452.13 |
| 5,887,935 A | * | 3/1999 | Sack | 280/47.38 |
| 5,921,574 A | * | 7/1999 | Driessen et al. | 280/655.1 |
| 6,099,022 A | * | 8/2000 | Pring | 280/648 |
| 6,523,853 B1 | * | 2/2003 | Cheng | 280/642 |
| 6,594,840 B2 | * | 7/2003 | Tomas et al. | 5/655 |
| 6,739,649 B2 | * | 5/2004 | Kelly et al. | 297/440.1 |
| 7,281,732 B2 | * | 10/2007 | Fox et al. | 280/642 |

\* cited by examiner

*Primary Examiner*—Hau Phan
(74) *Attorney, Agent, or Firm*—Muncy, Geissler, Olds & Lowe, PLLC

(57) ABSTRACT

An adjustable seat for a baby stroller with one-handed inclination control has a seat, a pair of rotating joints, and a one-handed adjusting mechanism. The pair of rotating joints are rotatively mounted on both sides of the seat and have a pair of connectors for detachably insertion into a pair of hold sockets firmly mounted on two sides of a baby stroller frame. A clutch member is movably received and engaged inside the rotating joint, and operatively associated with the one-handed adjusting mechanism via a flexible element. When a user actuates the clutch member by manipulating the one-handed adjusting mechanism, the rotating joint can rotatively modify its inclination relative to the baby stroller frame, so as to modify the inclination of the seat.

10 Claims, 6 Drawing Sheets

ADJUSTABLE SEAT FOR A BABY STROLLER WITH ONE-HANDED INCLINATION CONTROL

BACKGROUND OF THE INVENTION

1. Field of the Invention

The present invention relates to an adjustable seat for a baby stroller with one-handed inclination control, and more particularly, to a seat that is detachably connected to a baby stroller frame, the inclination of which can be modified by one hand.

2. Description of the Prior Art

The seat of a traditional baby stroller is normally secured to a stroller frame and the inclination of the back support generally cannot be modified for comfort of the baby sitting therein. Sitting in the baby stroller for a long time without changing body position is always difficult for a baby as well as an adult. Recently, baby strollers were improved as shown in U.S. Pat. No. 4,077,641, U.S. Pat. No. 4,344,649, U.S. Pat. No. 5,018,754, U.S. Pat. No. 5,240,265, and U.S. Pat. No. 5,454,584, all of which are furnished with a back support that can be rotated to adjust the inclination.

Although the above-mentioned US patents each have a different structure, they are have a common problem. Although the inclination of the backrest is adjustable, the seat support is still fixed. Moreover, the strollers disclosed in U.S. Pat. No. 4,072,318, U.S. Pat. No. 4,892,327, and U.S. Pat. No. 5,921,574 are provided with a seat support formed integrally with a back support, and have a pair of control mechanisms for modifying the inclination of the seat.

However, the operations for modifying the inclination via said mechanisms are normally inconvenient, as the users must always use both hands to manipulate the mechanism simultaneously on both sides of the stroller frame. Furthermore, once a user is utilizing both hands to modify the inclination on both sides simultaneously, they will have no extra hand available to prevent the baby from tumbling out of the seat once the seat is released by the mechanisms and suddenly becomes rotatable.

SUMMARY OF THE INVENTION

In order to resolve the above-mentioned problems, the present invention provides a seat for a baby stroller for which the inclination is adjustable by using one-hand only.

The embodiment of a seat according to the present invention comprises a seat, a pair of rotating joints, and a one-handed adjusting mechanism. The pair of rotating joints is rotatively mounted on both the sides of the seat and has a pair of connectors which can be detachably inserted into a pair of holding sockets, which are firmly mounted on the two sides of a baby stroller frame. A clutch member is movably received and engaged inside the rotating joint, and operatively associated with the one-handed adjusting mechanism via a flexible element. When a user actuates the clutch member by manipulating the one-handed adjusting mechanism, the rotating joint may rotatively modify its inclination relative to the baby stroller frame, so as to modify the inclination of the seat.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
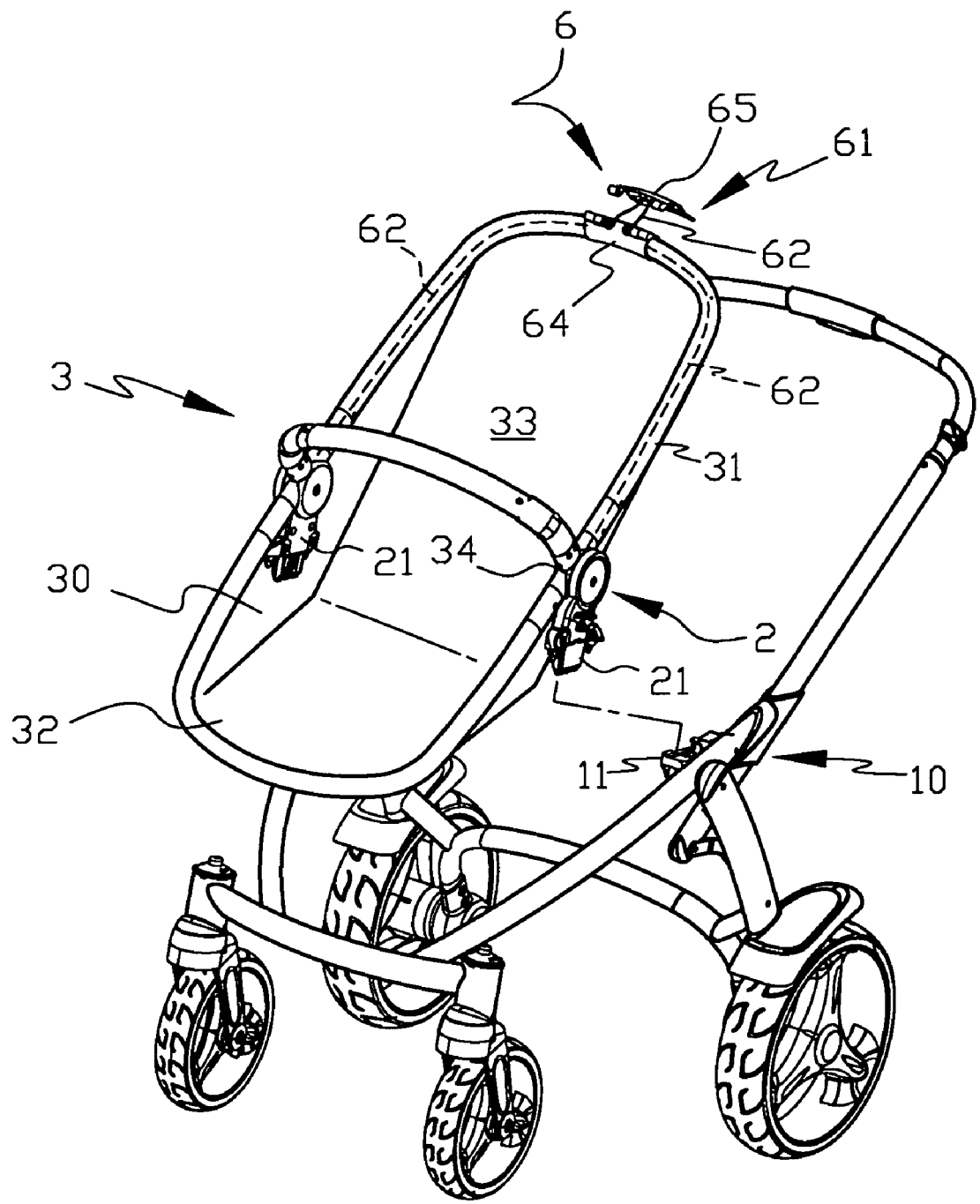
FIG. 1 is an exploded perspective view showing a baby stroller and the seat according to the present invention.
Figure 2:
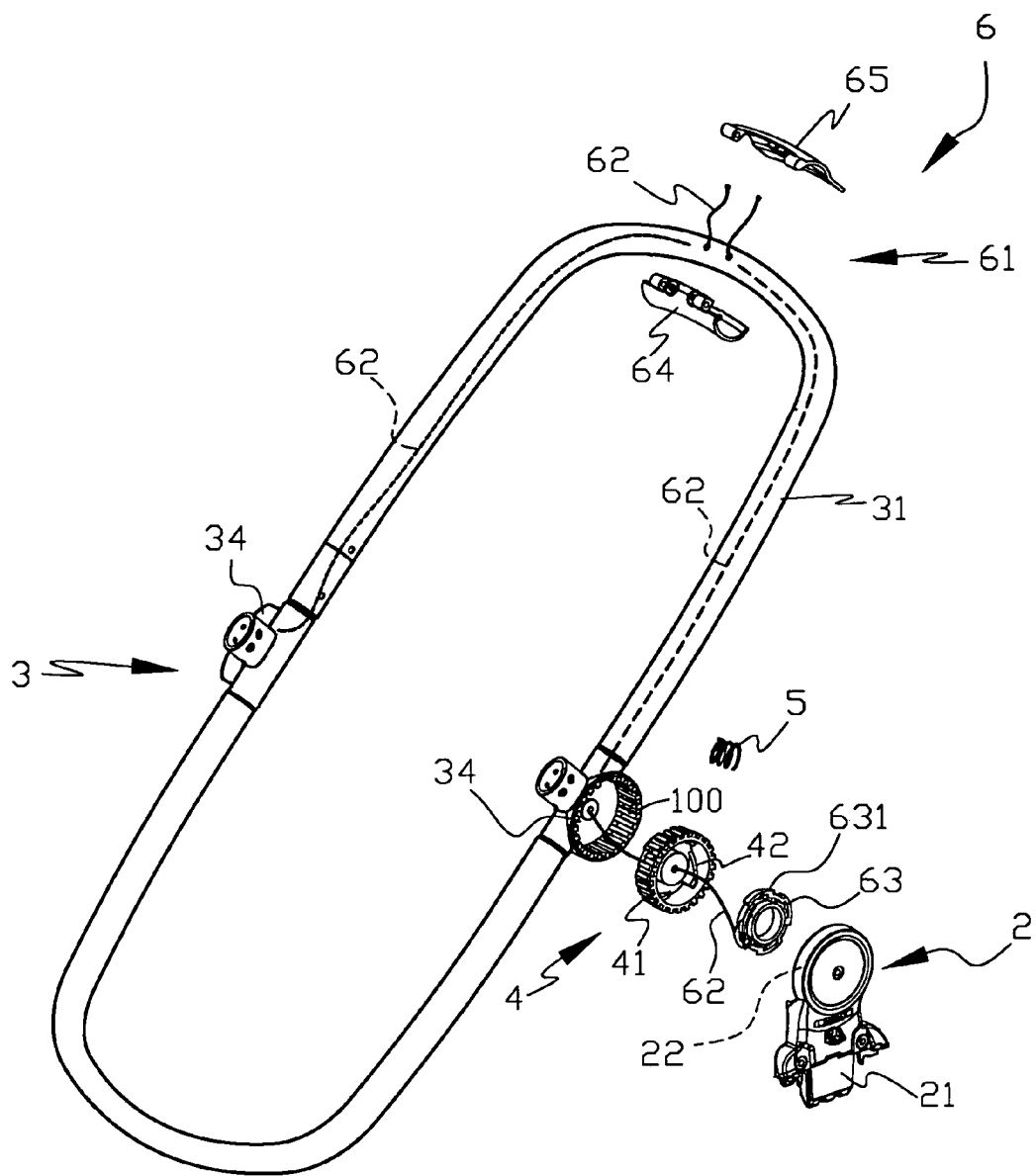
FIG. 2 is an exploded perspective view of the seat according to the invention.

Referring to FIGS. 1 and 2, an embodiment of a seat according to the present invention comprises a seat (3), a pair of rotating joints (2), and a one-handed adjusting mechanism (6). The pair of rotating joints (2) is rotatively mounted on both sides of the seat (3) and has a pair of connectors (21) which can be detachably inserted into a pair of hold sockets (11) which are firmly mounted on two sides of a baby stroller frame (10). A clutch member (4) is movably received and engaged between the rotating joint (2) and the pivotal base, and is operatively associated with the one-handed adjusting mechanism (6) via a flexible element (62).

When a user actuates the clutch member (4) by manipulating the one-handed adjusting mechanism (6), the rotating joint (2) can rotatively modify its inclination relative to the baby stroller frame (10), so as to modify the inclination of the seat (3).

The baby stroller frame (10) is equipped with the pair of hold sockets (11) for detachably holding the pair of connectors (21). Preferably, the baby stroller frame (10) includes a linkage system that is foldable from an erect position to a collapsed position, and vice versa.

The rotating joint (2) comprises a pivotal base (34) and a connector (21). The connector (21) has a toothed inner surface (22) and one end which extends downwardly from the rotating joint (2) and is sized so as to be insertable into the hold socket (11). The pivotal base (34) is firmly mounted on the side of the seat frame (31) and is formed with a toothed inner surface (100).

The seat (3) can be a regular seat having a seat frame (31), with a flexible seat fabric (30) which forms a seat support (32) and a back support (33). Alternatively, the seat (3) can be made of plastic that is integrally formed using a molding method. The pair of pivotal bases (34) is firmly connected with the seat frame (31).

Referring to FIG. 2, the clutch member (4) includes a toothed wheel (41), a resilient element (5) and a propeller (63). The resilient element (5) is normally biased on the toothed wheel (41) to keep it movably and slidably engaged with both the toothed inner surface (100) of the pivotal base (34) and the toothed inner surface (22) of the rotating joint (2) simultaneously. In this embodiment, the resilient element (5) can be a compression spring received mainly inside the pivotal base (34).

The toothed wheel (41) has one side formed with a prop-up slanted surface (42). The propeller (63) is mainly rotatably received within the rotating joint (2) and has a slanted surface (631) which corresponds to the prop-up slanted surface (42) and can urge the toothed wheel (41) to move and disengage from the toothed inner surface (22). This allows the seat (3) to be rotatable about the rotating joint (2) and modifies its inclination.

Figure 3:
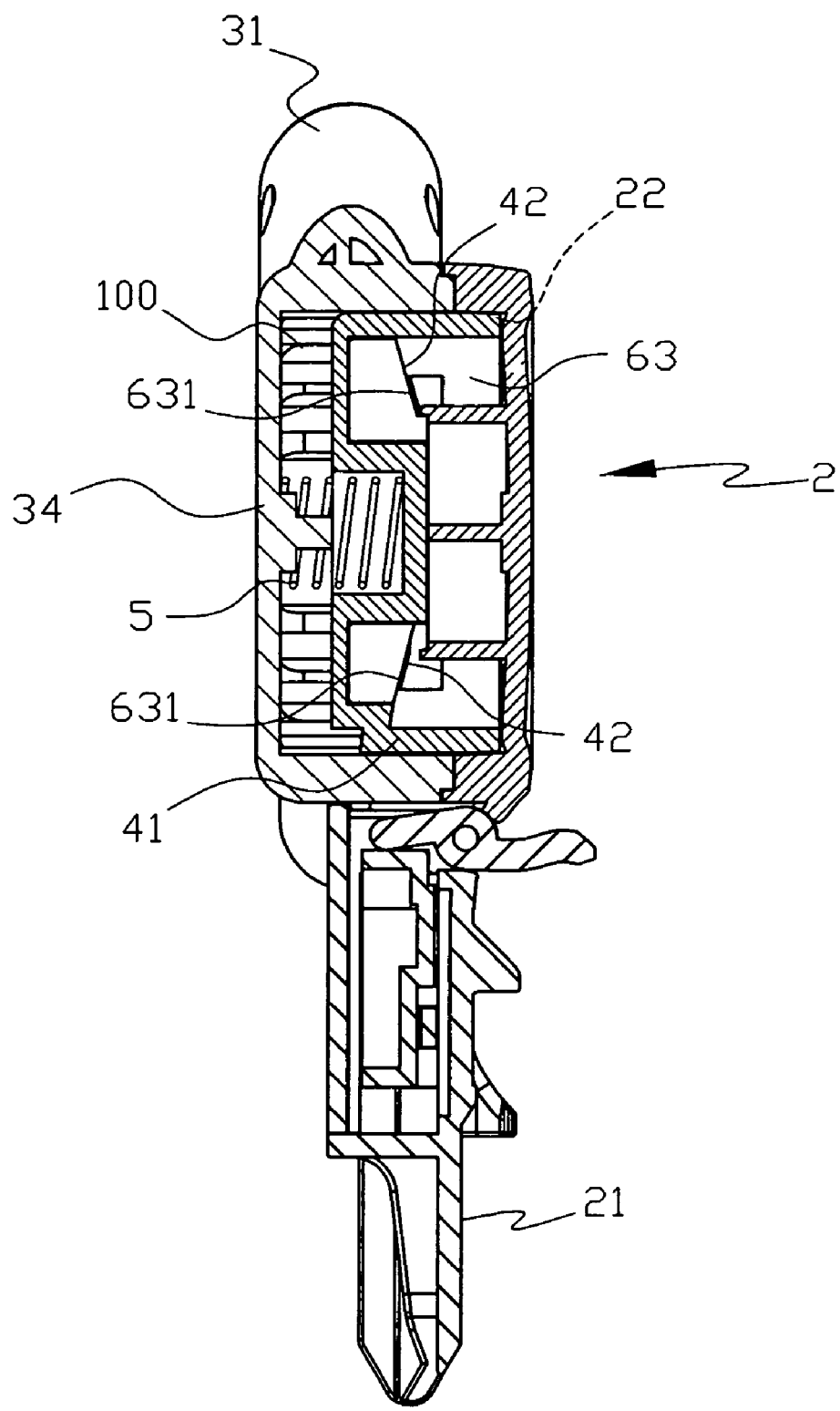
FIG. 3 is a cross-sectional view showing the toothed wheel, which is movably engaged with the toothed inner surface of the pivotal base and the rotating joint simultaneously.
Figure 4:
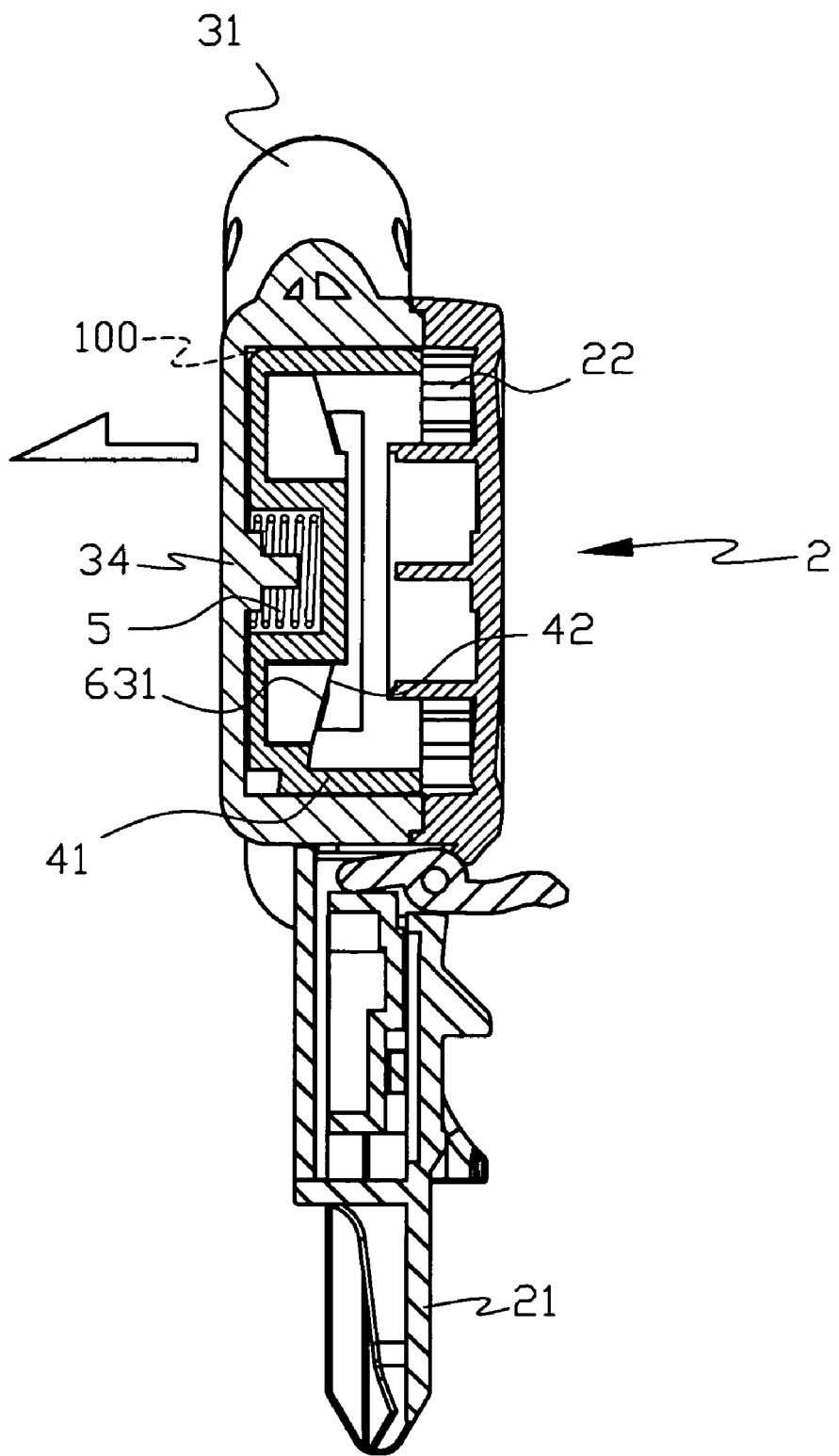
FIG. 4 is a cross-sectional view showing the toothed wheel being moved against the biasing of the resilient element by the propeller, and disengaged from the toothed inner surface of the rotating joint.
Figure 5:
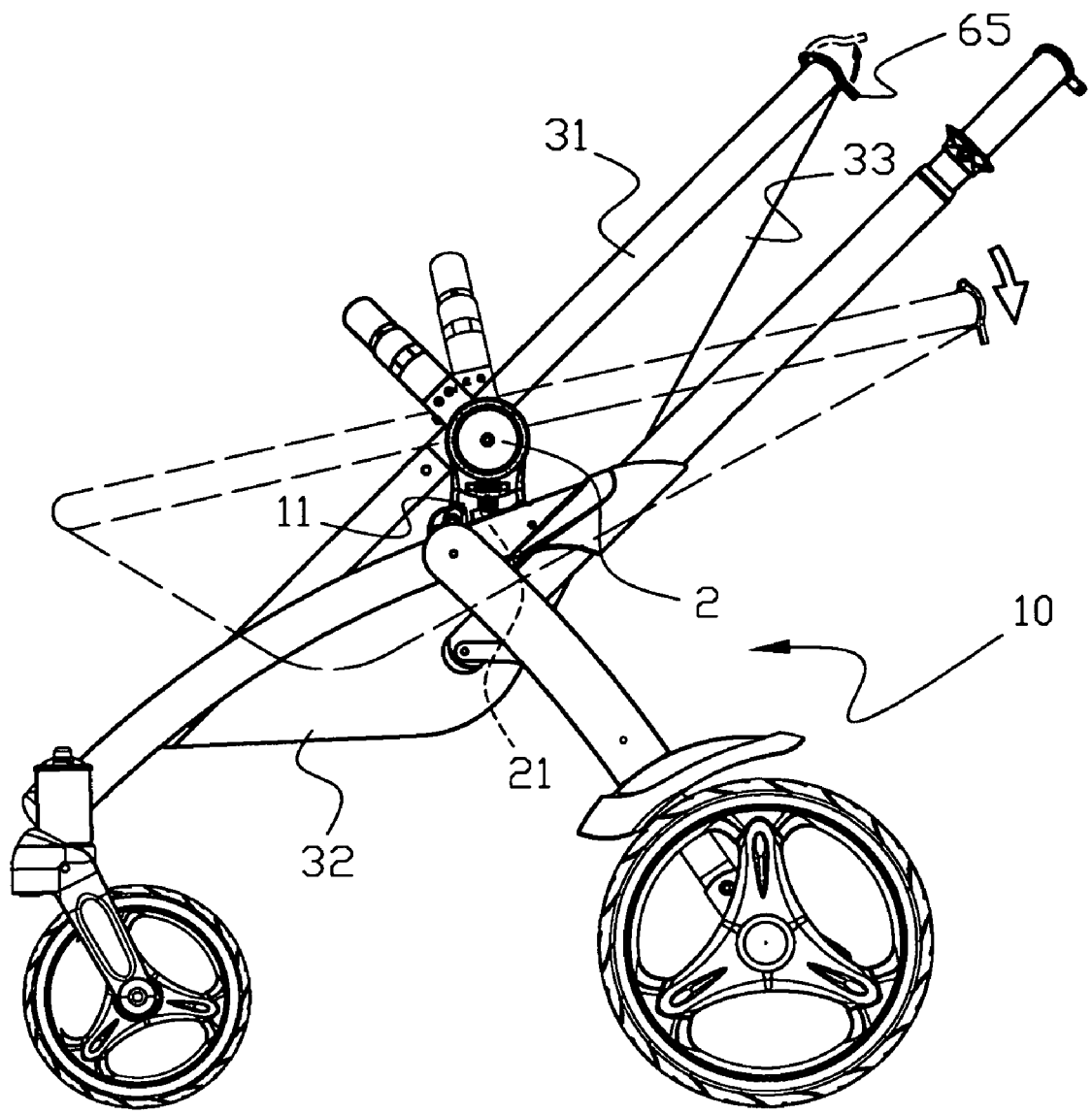
FIG. 5 is a schematic view showing the inclination of the seat being modified to a new angle by one hand flipping up the manipulating handle.
Figure 6:
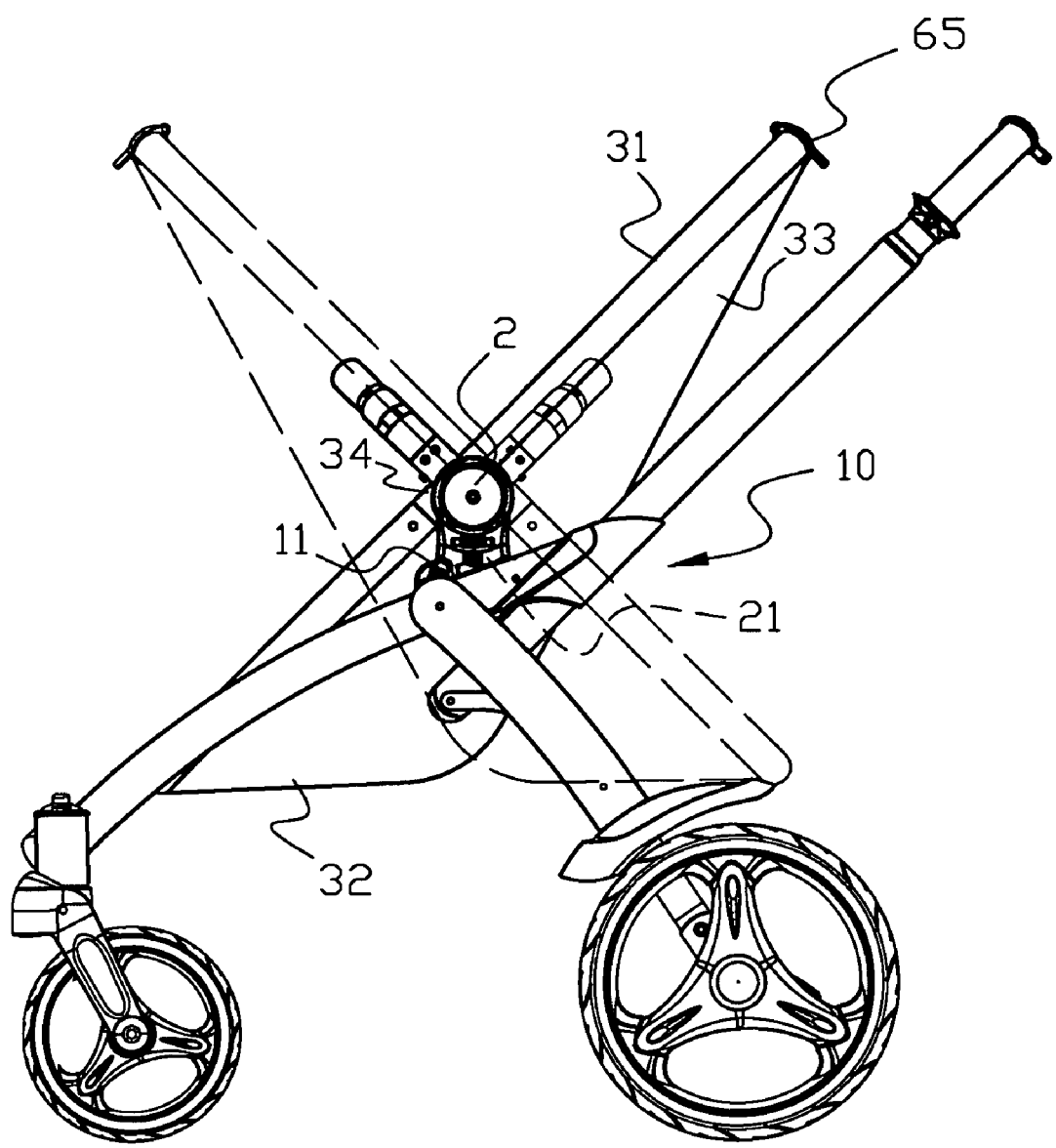
FIG. 6 is a schematic view showing a seat that can be selectively connected in an opposite direction.

Referring to FIGS. 3 and 4, the propeller (63) of the present embodiment is associated with the manipulating handle (61) via the flexible element (62). The user can flip the manipulating handle (61) to drive the propeller (63) via the flexible element (62). This causes the slanted surface (631) to urge the toothed wheel (41) to move against the resilient element (5) toward the pivotal base (34), and therefore disengage from the toothed inner surface (22). Once the toothed wheel (41) disengages from the inner-toothed surface (22), the inclination of the seat (3) can be modified as shown in FIGS. 5 and 6.

The one-handed adjusting mechanism (6) includes a remote actuator (61) and a pair of flexible elements which extend through the support tube (31) and connect to the propeller (63) of the clutch member (4). The remote actuator (61) comprises a base (64) and a manipulating handle (65). The base (64) is mounted on one end of the support tube (31) and is pivotally connected with the manipulating handle (65).

Although the figures and foregoing description discuss a one-handed adjusting mechanism (6), there are additional examples of remote actuators described in U.S. Pat. No. 4,846,494, U.S. Pat. No. 4,906,017, U.S. Pat. No. 5,769,447, and U.S. Pat. No. 6,068,284. These examples can be applied to the remote actuator (61) to pull the flexible element (62) and effect the one hand operation.

To summarize the above-described embodiments, a user can flip the manipulating handle (65) using one hand and then successfully modify the inclination of seat (3) up and down as desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adjustable seat for a baby stroller with one-handed inclination control, comprising:

a seat having a seat support, a back support, and a pair of pivotal bases firmly connected at the both sides of the seat, wherein each of the pivotal bases has a toothed inner surface;

a pair of rotating joints pivotally connected to the pair of pivotal bases, each of the rotating joints having a toothed inner surface and a connector, the connector extending downwardly at one end for detachably connecting with a baby stroller frame;

a clutch member having a toothed wheel, a resilient element and a propeller, the resilient element being biased on the toothed wheel to keep the toothed wheel movably and slidably engaged with both the toothed inner surface of the pivotal base and the toothed inner surface of the rotating joint simultaneously; and a one handed adjusting mechanism having a remote actuator and a flexible element, the remote actuator being connected to the propeller by the flexible element to drive the toothed wheel to disengage from the toothed inner surface of the rotating joint.

2. The adjustable seat for a baby stroller with one-handed inclination control as claimed in claim 1, wherein a pair of holder sockets is mounted on both sides of the baby stroller frame for detachably receiving the respective connectors of the pair of rotating joints.

3. The adjustable seat for a baby stroller with one-handed inclination control as claimed in claim 1, wherein the baby stroller frame has a linkage system that is reversibly foldable from an erect position to a collapsed position.

4. The adjustable seat for a baby stroller with one-handed inclination control as claimed in claim 1, wherein the clutch member is driven by the one handed adjusting mechanism to disengage from the toothed inner surface of the rotating joint, so as to allow the seat to rotate about the rotating joint, thereby modifying the inclination of the seat.

5. The adjustable seat for a baby stroller with one-handed inclination control as claimed in claim 1, wherein the seat is integrally made of plastic.

6. The adjustable seat for a baby stroller with one-handed inclination control as claimed in claim 1, wherein the seat includes a seat frame with a flexible seat fabric for forming the seat support and the back support.

7. The adjustable seat for a baby stroller with one-handed inclination control as claimed in claim 1, wherein the propeller is rotatably received within the rotating joint and has a slanted surface for urging in the toothed wheel to move and disengage from the toothed inner surface of the rotating joint.

8. The adjustable seat for a baby stroller with one-handed inclination control as claimed in claim 1, wherein the toothed wheel has a prop-up slanted surface corresponding to the slanted surface of the propeller.

9. The adjustable seat for a baby stroller with one-handed inclination control as claimed in claim 1, wherein the resilient element is a compression spring.

10. The adjustable seat for a baby stroller with one-handed inclination control as claimed in claim 1, wherein the remote actuator includes a base and a manipulating handle, the base being mounted at one end of the seat and the manipulating handle being pivotally connected to the base and connected to the propeller via the flexible element.

* * * * *